(12) United States Patent
Galmiche

(10) Patent No.: US 11,888,365 B2
(45) Date of Patent: Jan. 30, 2024

(54) CONDUCTOR BAR AND ASSOCIATED ROTOR AND ROTATING ELECTRICAL MACHINE

(71) Applicant: GE Energy Power Conversion Technology Limited, Warwickshire (GB)

(72) Inventor: Christophe Galmiche, Toul (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 191 days.

(21) Appl. No.: 17/413,936

(22) PCT Filed: Dec. 12, 2019

(86) PCT No.: PCT/EP2019/084846
§ 371 (c)(1),
(2) Date: Jun. 14, 2021

(87) PCT Pub. No.: WO2020/120660
PCT Pub. Date: Jun. 18, 2020

(65) Prior Publication Data
US 2022/0123637 A1 Apr. 21, 2022

(30) Foreign Application Priority Data
Dec. 14, 2018 (FR) ...................................... 1872968

(51) Int. Cl.
*H02K 17/16* (2006.01)
(52) U.S. Cl.
CPC .................................. *H02K 17/165* (2013.01)

(58) Field of Classification Search
CPC .... H02K 17/165; H02K 17/16–17/168; H02K 17/18; H02K 17/20
See application file for complete search history.

(56) References Cited

U.S. PATENT DOCUMENTS

| | | | | |
|---|---|---|---|---|
| 5,495,133 A | * | 2/1996 | Bawin ...................... | H02K 1/28 310/211 |
| 5,532,533 A | * | 7/1996 | Mizutani ................ | H02K 21/14 310/68 B |
| 8,421,296 B2 | * | 4/2013 | Lateb ................... | H02K 17/205 310/212 |
| 9,106,123 B2 | * | 8/2015 | Biesenbach ............ | H02K 15/02 |

(Continued)

FOREIGN PATENT DOCUMENTS

| | | |
|---|---|---|
| CH | 683957 | 6/1994 |
| DE | 19956042 A1 | 5/2001 |

(Continued)

OTHER PUBLICATIONS

CH-683957-A5 (Year: 1994).*
International Search Report from International Appl. No. PCT/EP2019/084857, dated Jan. 27, 2020.

*Primary Examiner* — Thomas Truong
(74) *Attorney, Agent, or Firm* — WOOD IP LLC

(57) ABSTRACT

The conductor bar for a squirrel-cage rotor comprises at least one end which is partially slit such that a section of the end forms two symmetrical branches relative to the slit. The centre of gravity of each branch is arranged such that the branches flare towards the outside of the bar under the effect of centrifugal force when the rotor is rotated.

20 Claims, 15 Drawing Sheets

(56) References Cited

U.S. PATENT DOCUMENTS

| | | | |
|---|---|---|---|
| 10,505,433 B2 * | 12/2019 | Galmiche | ............ H02K 17/165 |
| 11,218,044 B2 | 1/2022 | Galmiche et al. | |
| 11,303,173 B2 | 4/2022 | Galmiche et al. | |
| 11,316,393 B2 | 4/2022 | Galmiche | |
| 11,381,135 B2 | 7/2022 | Galmiche et al. | |
| 2014/0252910 A1 * | 9/2014 | Kunihiro | .............. H02K 17/165 |
| | | | 310/211 |

FOREIGN PATENT DOCUMENTS

| | | |
|---|---|---|
| EP | 0608675 A1 | 8/1994 |
| EP | 0609645 A1 | 8/1994 |
| EP | 2306624 A1 | 4/2011 |
| EP | 3051675 A1 | 8/2016 |
| WO | 2011147846 A2 | 12/2011 |
| WO | 2020120660 A1 | 6/2020 |

* cited by examiner

CONDUCTOR BAR AND ASSOCIATED ROTOR AND ROTATING ELECTRICAL MACHINE

The present invention concerns squirrel-cage asynchronous rotating electrical machines and relates more particularly to the end of the conductor bars incorporated in a rotor of the machine.

The present invention further relates to a rotating electrical machine comprising such a rotor.

Reference is made to the European patent document EP 0 608 675 which describes such a rotor.

FIG. 1 shows a rotor 1 including a shaft 2 supported on either side on bearings (not shown) and a magnetic mass 3 formed by rotor sheets supported by said shaft, the rotor sheets being held by being clamped thereon.

The rotor sheets are clamped together by two short-circuit rings 4 disposed at each end of the magnetic mass 3 and shrunk onto the shaft 2.

The short-circuit rings 4 are joined together by bars 5 to form the squirrel cage of the rotor.

The bars are fixed at a single point to the magnetic mass 3 by means of a screw 6, the fixing point being located halfway along the length of the magnetic mass.

The ends of the bars 5 are freely disposed in bores made at the periphery of the short-circuit rings 4 such that a tolerance clearance remains and allows for the free thermal expansion of the bar in the bore in the ring 4.

Nonetheless, this clearance must be small enough to ensure sufficient contact to allow electric current to flow between the bars 5 and the rings 4.

The bars 5 are hollowed out and slit over a distance which essentially corresponds to the axial thickness of the short-circuit ring 4.

FIG. 2 shows one end of a circular bar 5, which is hollow and slit to define two lips 7 and 8, each lip 7 and 8 comprising a centre of gravity G1 and G2 located close to the slit.

Under the effect of centrifugal force, the lips 7 and 8 of the bar 5 move apart and thus exert an increasingly high pressure with the rotational speed on the inner face of the bore ensuring electrical contact while allowing for sliding under the effect of thermal expansion, in particular in an axial direction.

The arrows provided in FIG. 2 show the contact surface area between the bar 5 and the bore under the effect of centrifugal force.

The contact surface area extends about an angle α.

However, only part of the outer periphery of the bar 5 is in contact with the bore, the angle α being less than 180°, i.e. less than half of the outer peripheral surface of the bar is in contact with the ring 4.

When the rotor 1 is rotated, since the centres of gravity G1 and G2 of the lips 7 and 8 are close to the slit, the lips 7 and 8 become deformed inwards relative to the hollowed out part of the end of the bar 5, moving the peripheral end of the lips 7 and 8 away from the inner surface of the bore of the short-circuit rings 4. As a result, the peripheral end of the lips 7 and 8 is not in contact with the inner face of the bore, reducing the contact surface area about the angle α.

Since the torque and the power developed by an asynchronous rotating electrical machine depend in particular on the intensity of the induced currents flowing through the bars, the contact surface area between the bars and the short-circuit rings must be improved in order to increase the torque and power developed by the squirrel-cage rotating electrical machine without changing the physical features of the machine, in particular the number of bars inserted into the rotor.

The invention thus proposes overcoming the drawbacks of the rotors for a squirrel-cage asynchronous rotating electrical machine according to the prior art, preferably having a rotational speed that is greater than 3,000 rpm, for example equal to 10,000 rpm.

In light of the above, the invention proposes, according to one aspect, a conductor bar for a squirrel-cage rotor, comprising at least one end that is partially slit such that a section of the end forms two symmetrical branches relative to the slit.

The centre of gravity of each branch is disposed such that the branches move apart in an outwards direction relative to the bar under the effect of centrifugal force when the rotor is rotated.

According to one feature, the end having a round section is hollow and comprises a flat section disposed at the free ends of the branches.

Advantageously, the section includes straight or curved ends connected by straight or curved sides.

Preferably, the section further comprises a flat section disposed at a free end of each branch.

According to another feature, the end is slit over the entire section.

According to another aspect, the invention proposes a squirrel-cage rotor for a squirrel-cage asynchronous rotating electrical machine, comprising two compaction elements clamping a cylindrical magnetic mass, with conductor elements inserted between the magnetic mass and the compaction elements, and conductor bars as defined hereinabove disposed in recesses in the magnetic mass and distributed evenly over at least one diameter of the magnetic mass such that the conductor elements and the conductor bars form a squirrel cage, the end of the bars being partially slit over at least one distance facing the conductor element, and each conductor bar being oriented in a recess such that the slit is directed towards a rotational axis of the rotor.

According to one feature, when the end of the bar is partially slit, the part of the end connecting the two branches faces the outer periphery of the rotor.

Preferably, the end comprises an oblong hole oriented in an axial direction and the conductor element comprises a tapped through-hole, a threaded pin being inserted into the tapped through-hole such that the pin fits into the oblong hole to prevent the conductor bar from rotating about itself.

Advantageously, the end comprises an oblong hole oriented and opening out in an axial direction, and the conductor element comprises a tapped through-hole, a threaded pin being inserted into the tapped through-hole such that the pin fits into the oblong hole to prevent the conductor bar from rotating about itself.

Preferably, when the end of the bar is slit over the entire section, the end comprises two sub-parts separated by a plane perpendicular to the slit, the sub-part comprising the dimension perpendicular to the slit that is the longest facing the outer periphery of the rotor.

According to another feature, the conductor element or the compaction element comprises a tapped through-hole, a threaded pin being inserted into the tapped through-hole such that the pin fits into the slit to prevent the conductor bar from rotating about itself.

Advantageously, when the end of the bar comprises a flat section, the bar is furthermore oriented such that the flat section is facing a rotational axis of the rotor.

Preferably, the end of the conductor bar comprising a flat section forms a recess, a flexible strip being inserted into said recess so as to exert a radial pre-stress to bring the outer periphery of the end of the bar into contact with the conductor element.

Advantageously, the end of the conductor bar comprising a flat section forms a recess, a flexible strip being inserted into said recess. This strip comprises three segments, a first and a second segments being inserted into the recess so as to exert a radial pre-stress to bring the outer periphery of the end of the bar into contact with the conductor element, one end of the first segment bearing against a bearing face of the end located at the end of the flat section opposite a plug screwed into an internal tapping located opposite the magnetic mass of the conductor element or of the compaction element. The third segment of the flexible strip is housed in a space between the end of the bar and the plug, one end of the third segment being housed in a groove in the through-hole located opposite the magnetic mass and being pinched by the screwed plug, the flexible inclined segment being deformed in an axial direction by the plug screwing operation so as to exert an axial pre-stress on the bearing face of the conductor bar to limit the displacement of the conductor bar in the axial direction and so as to prevent the bar from rotating about itself.

According to another feature, the flexible strip comprises a flexible metal strip or a flexible insulating strip.

Advantageously, the conductor element comprises a short-circuit disc or a short-circuit ring.

Preferably, the compaction element comprises a clamping plate or a compaction flange of a non-through half-shaft.

According to yet another feature, the magnetic mass comprises compacted magnetic sheets.

Advantageously, the magnetic mass comprises a stack of metal plates.

Preferably, the magnetic mass comprises a one-piece body.

According to another aspect, the invention proposes an asynchronous rotating electrical machine comprising a rotor as defined hereinabove.

Other features and advantages of the invention will be better understood upon reading the following description given of embodiments of the invention, provided as non-limiting examples and with reference to the drawings, in which:

FIG. 1, which has already been mentioned, shows a rotor of a squirrel-cage asynchronous rotating electrical machine according to the prior art;

FIG. 2, which has already been mentioned, shows the end of a conductor bar according to the prior art;

Figure 21:
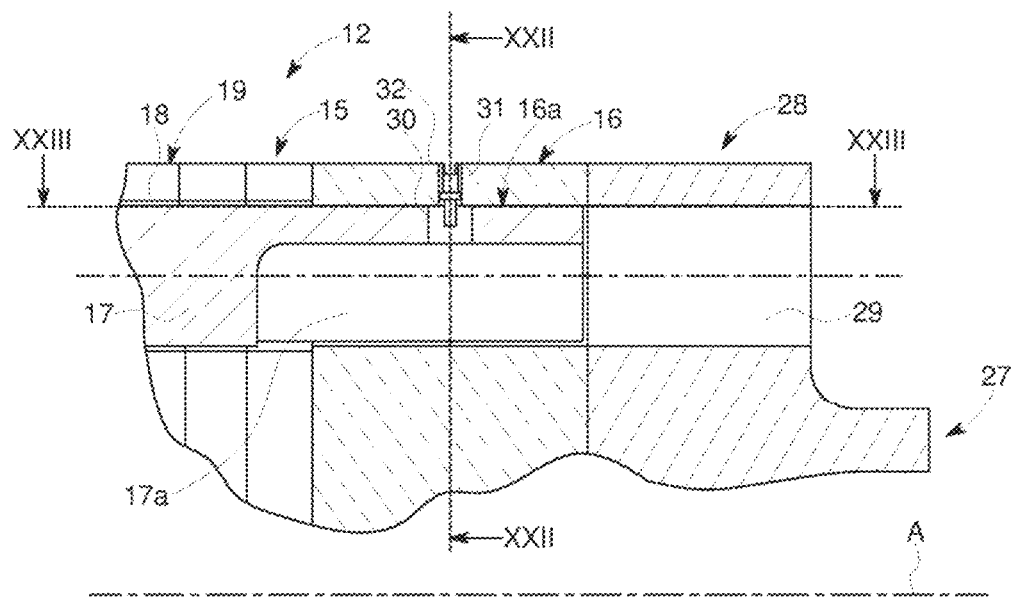
Figure 23:
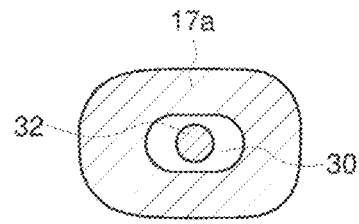
Figure 24:
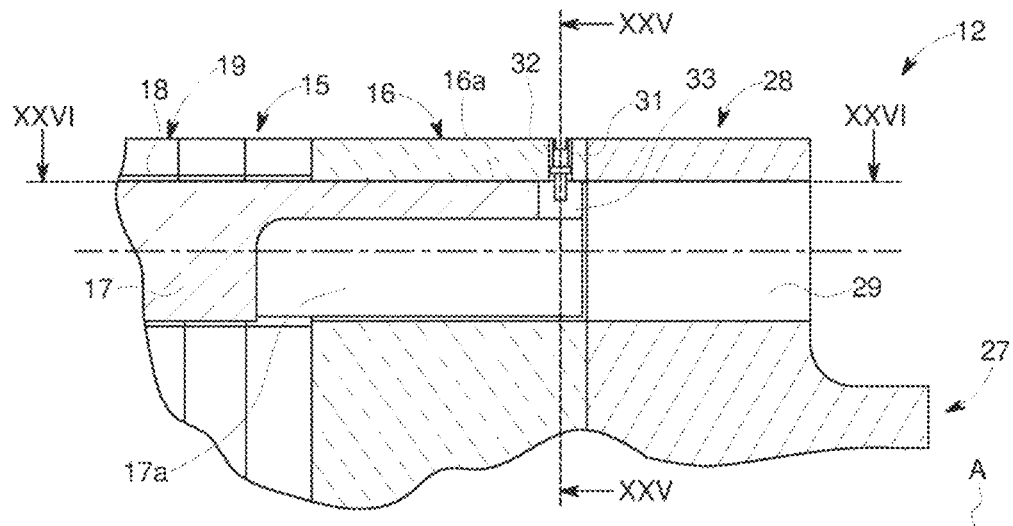
Figure 25:
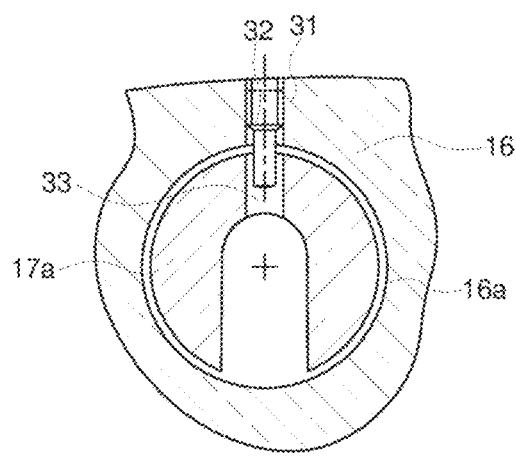
Figure 26:
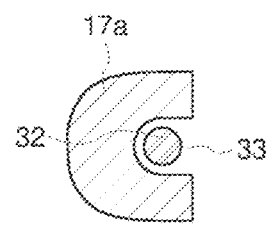
Figure 27:
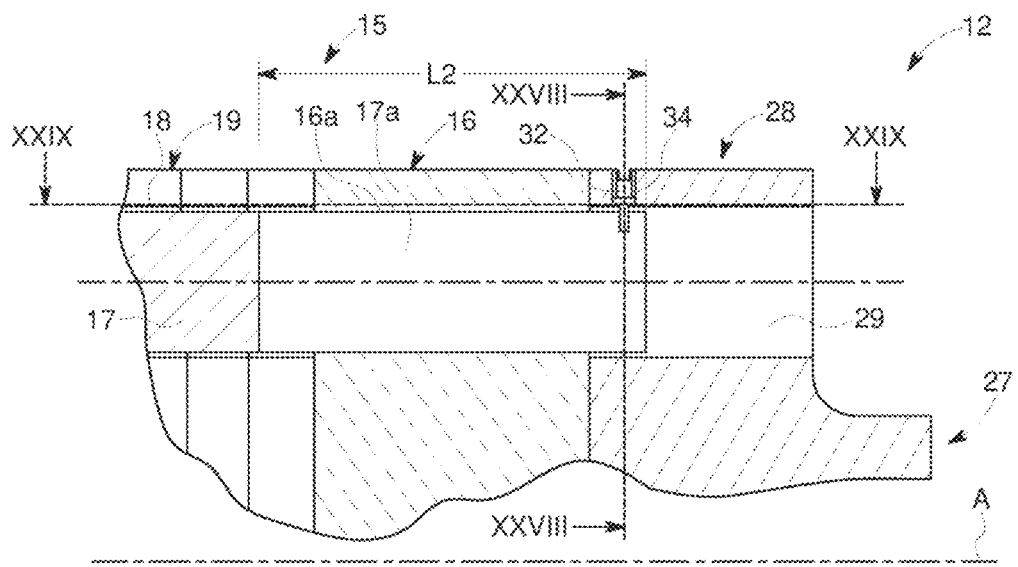
Figure 28:
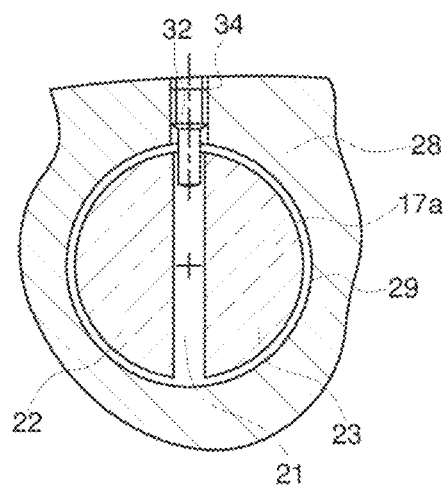
Figure 29:
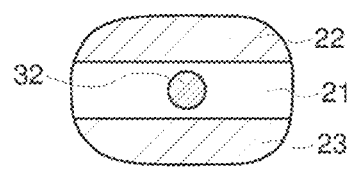
Figure 30:
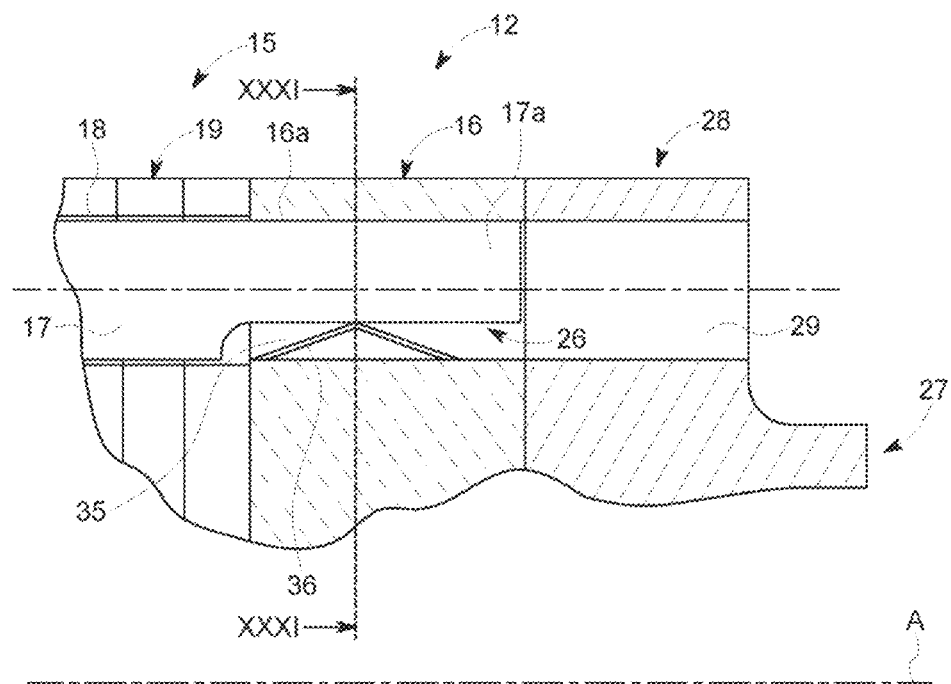
Figure 31:
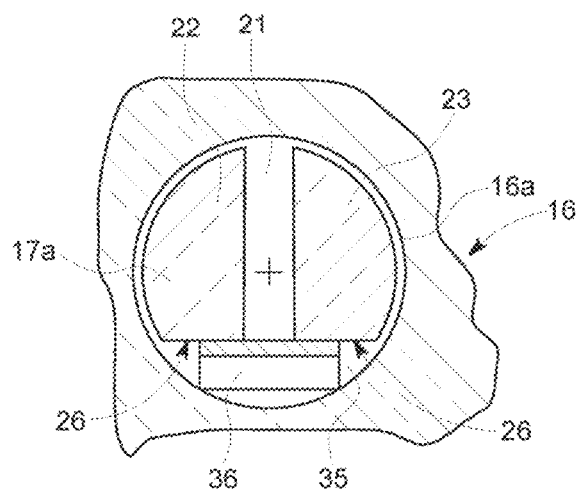
Figure 32:
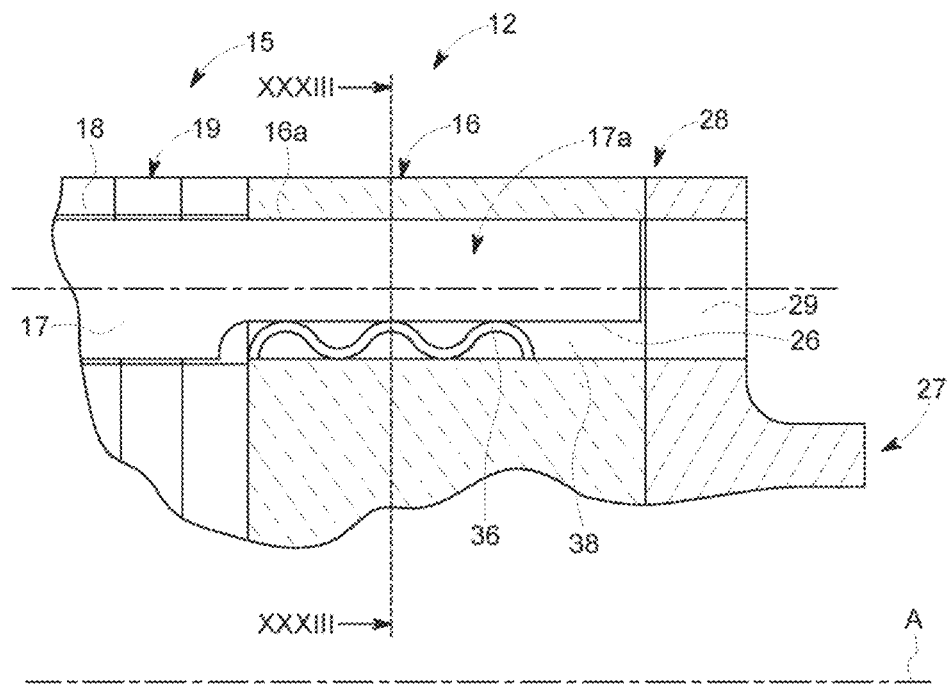
Figure 33:
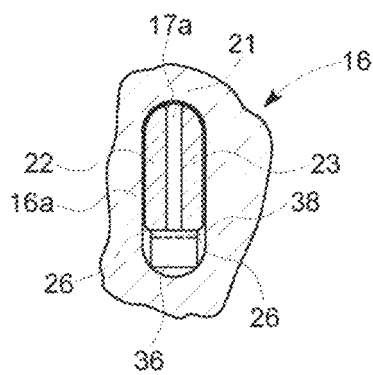
Figure 34:
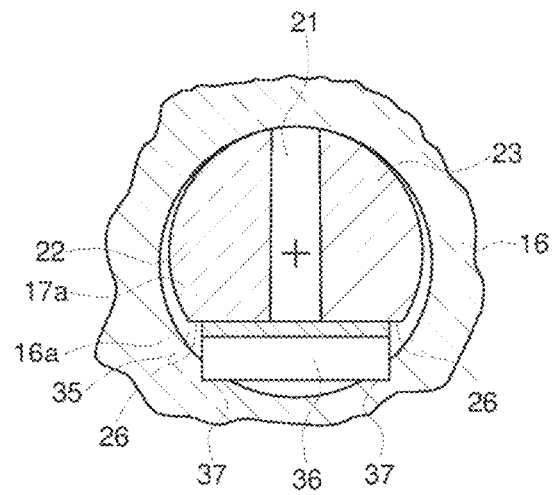
Figure 35:
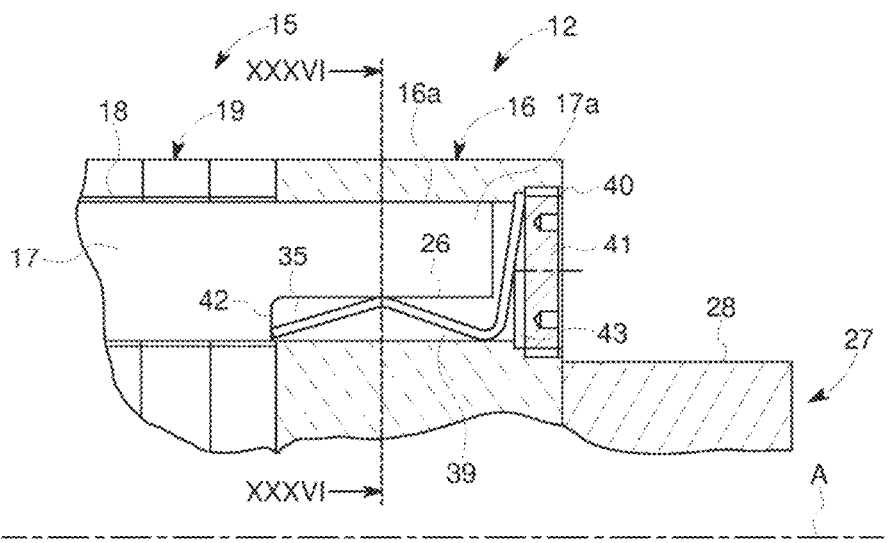
Figure 36:
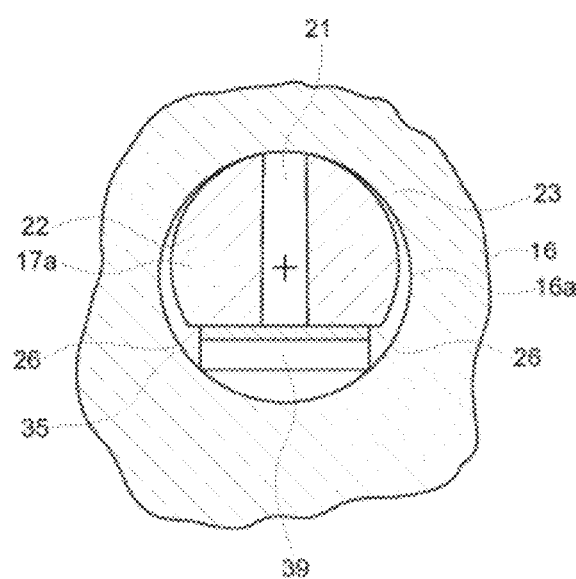

FIGS. 21, 21, and 23 show partial sectional views of a second embodiment of the rotor;

FIGS. 24, 25 and 26 show partial sectional views of a third embodiment of the rotor;

FIGS. 27, 28 and 29 show partial sectional views of a fourth embodiment of the rotor;

FIGS. 30 and 31 show partial sectional views of a fifth embodiment of the rotor;

FIGS. 32 and 33 show partial sectional views of a sixth embodiment of the rotor;

FIG. 34 shows a partial sectional view of a seventh embodiment of the rotor; and FIGS. 35 and 36 show partial sectional views of an eighth embodiment of the rotor.

Figure 1:
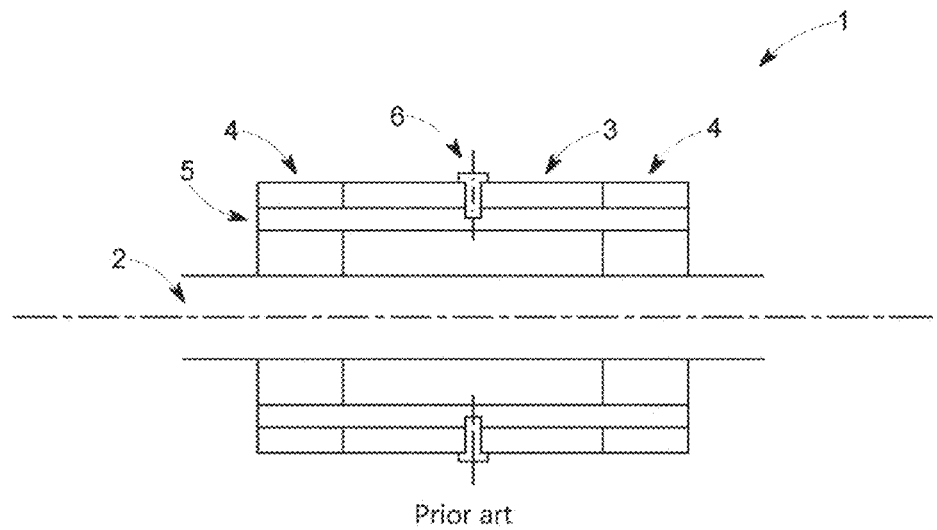
Figure 2:
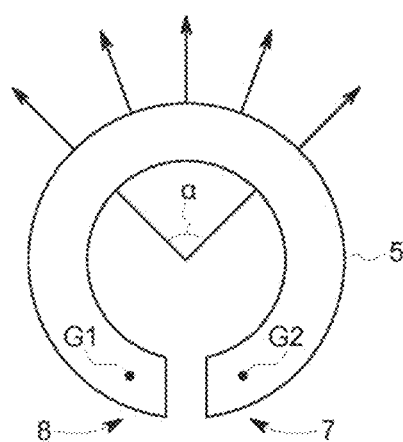
Figure 3:
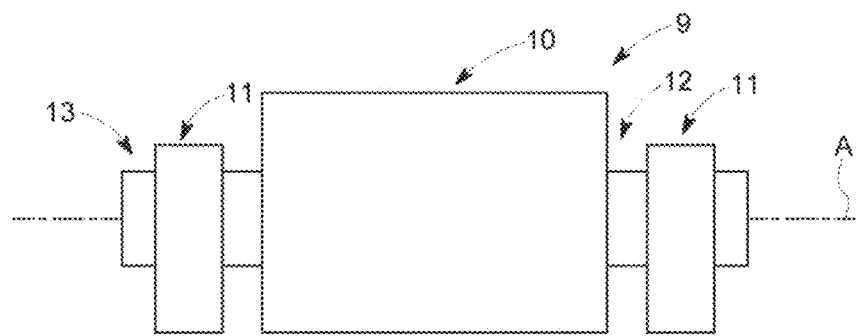
FIG. 3 shows one embodiment of a squirrel-cage asynchronous rotating electrical machine.

Reference is made to FIG. 3, which shows one embodiment of a squirrel-cage asynchronous rotating electrical machine 9 comprising a stator 10, bearings 11 and a rotor 12 inserted into the stator 10 and the bearings 11.

The rotor 12 comprises a rotor shaft 13 made, for example, of steel, having an axis A that is coincident with the rotational axis of the rotor 12.

Figure 4:
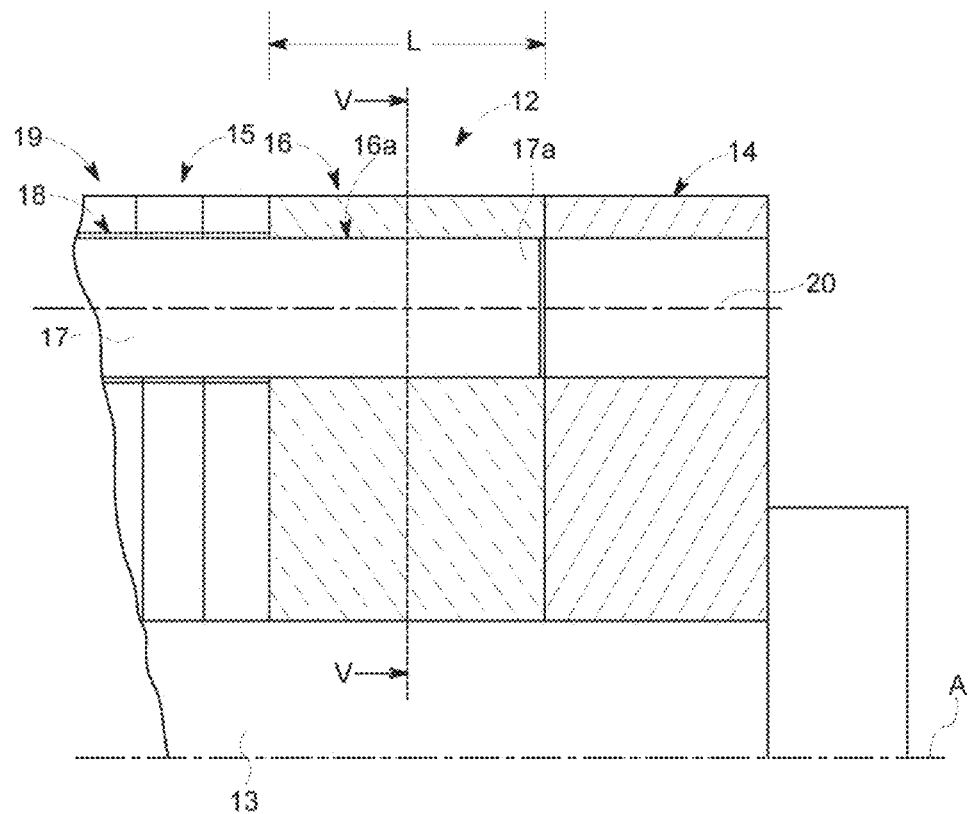
FIGS. 4 and 5 show partial sections of a first embodiment of the rotor.
Figure 5:
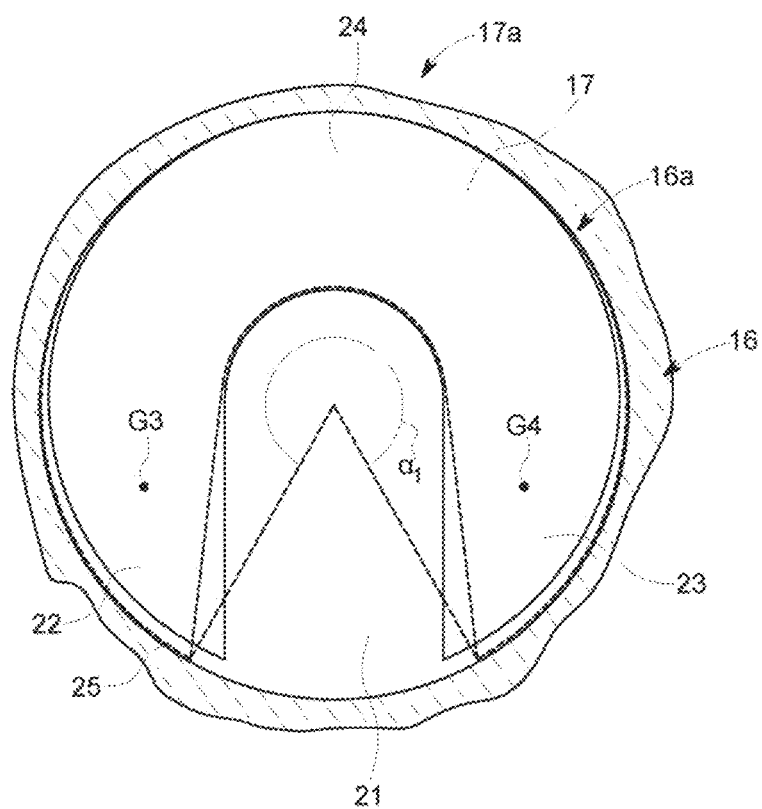

Reference is made to FIGS. 4 and 5, which show partial sectional views of a first embodiment of the rotor 12 in an axial direction of the rotor and in the direction V-V.

The rotor 12 comprises two compaction elements comprising clamping plates 14 clamping a cylindrical magnetic mass 15, conductor elements including short-circuit rings 16 inserted between the magnetic mass 15 and the compaction clamping plates 14, and conductor bars 17 housed in recesses 18 in the magnetic mass and distributed evenly over a diameter of the magnetic mass.

The recesses 18 are dimensioned so as to compensate for the expansion of the conductor bars 17 under the effect of the heat generated by the current flow during operation thereof and thus to prevent thermo-mechanical unbalance of the rotor.

One end 17a of the conductor bar 17 is housed inside a through-hole 16a in the short-circuit ring 16.

The short-circuit rings 16 and the conductor bars 17 are made, for example, of copper and are electrically connected to one another to form a squirrel cage when the rotor is rotated.

The end 17a of the bar 17 is freely disposed in the through-hole 16a such that a tolerance clearance remains, which allows for the free thermal expansion of the bar 17 in the through-hole 16a, in particular in an axial direction.

Nonetheless, this clearance must be small enough to ensure sufficient contact to allow electric current to flow between the bar 17 and the short-circuit ring 16.

The magnetic mass 15 comprises metal plates 19, the thickness of the metal plates preferably being more than 5% of the outer diameter of the magnetic mass 15.

Alternatively, the magnetic mass 15 can comprise magnetic sheets having a thickness of less than 2 mm, preferably 0.65 mm or 0.5 mm.

According to yet another alternative embodiment, the magnetic mass 15 can comprise a one-piece body, made of steel for example.

According to yet another alternative embodiment, the conductor element comprises a short-circuit disc.

The clamping plate 14 comprises insertion holes 20, each disposed facing a recess 18.

The through-hole 16a, the bar 17, the recess 18 and the insertion hole 20 have a substantially identical section such that the bar 17 can be inserted into the recess 18 and make an electrical contact with the short-circuit ring 16.

According to an alternative embodiment, not shown, the outer diameter of the clamping plate 14 is smaller than the pitch circle diameter of the bars 17 such that the bars can be inserted into the holes 16a and the recesses 18.

The section of the through-hole 16a, of the bar 17, of the recess 18 and of the insertion hole 20 is round.

Reference is made more particularly to FIG. 5, which shows a section in the direction V-V of the end 17a of the conductor bar 17 housed inside the through-hole 16a.

The end 17a of the conductor bar comprises a slit 21.

The end 17a is partially slit such that the section of the end 17a forms two branches 22 and 23 that are symmetrical relative to the slit 21.

The two branches 22 and 23 are connected by a part 24 of the end 17a.

When the rotor 12 is not rotating, the contact surface area between the bar 17 and the through-hole 16a in the short-circuit ring 16 is substantially linear.

The end 17a of the bar 17 is partially slit over a distance L facing the conductor element 16.

The bar 17 is oriented inside the recess 18 such that the slit 21 is oriented towards the rotational axis A of the rotor 12.

The part 24 of the end 17a connecting the two branches 22 and 23 is facing the outer periphery of the rotor 12.

The centre of gravity G3, G4 of each branch 22, 23 is disposed such that the branches 22, 23 move apart in an outwards direction relative to the bar 17 under the effect of centrifugal force when the rotor 12 is rotated.

The section 25 represents the section of the end 17a of the bar 17 deformed under the effect of centrifugal force.

The peripheral surface of the bar 17 deformed under the effect of centrifugal force comes into contact with the surface of the through-hole 16a and extends about an angle α1 greater than 180°.

Since the contact surface area between the peripheral surface of the deformed bar 17 and the surface of the through-hole 16a about the angle α1 is larger than that obtained with one end of a known bar of the prior art, the electric current flowing through the bars 17 is higher than that flowing through the known bars of the prior art. As a result, the electrical power of the asynchronous rotating electrical machine 9 is increased.

The profile of the end 17a of the bar 17 is determined, for example, by digital simulation such that the contact between the bar 17 and the through-hole 16a is as large as possible when the rotor 12 reaches the rated operating speed of the rotating electrical machine.

The width of the slit 21 is, for example, equal to about 5 to 30% of the diameter of the bar 17, preferably about 10 to 20% of the diameter of the bar 17.

The radial depth of the slit 21 is, for example, equal to about 60 to 90% of the diameter of the bar 17, preferably equal to about 70 to 85% of the diameter of the bar 17.

Figure 6:
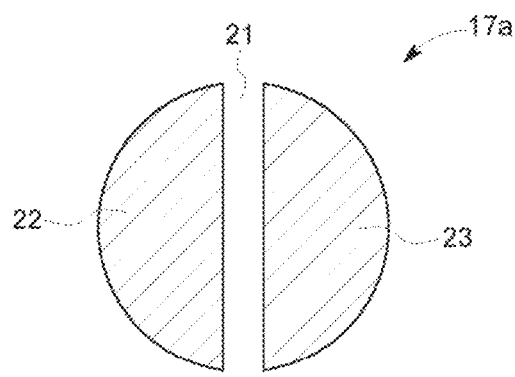
FIGS. 6, 7, 8, 9, 10, 11, 12, 13, 14, 15, 16, 17, 18, 19 and 20 show sectional views of one embodiment of the end of the conductor bar.

FIG. 6 shows a section of a second embodiment of the end 17a of the bar 17.

This embodiment differs from the embodiment shown in FIG. 5 in that the end is slit over the entire section.

The two branches 22 and 23 are no longer connected to one another.

Figure 7:
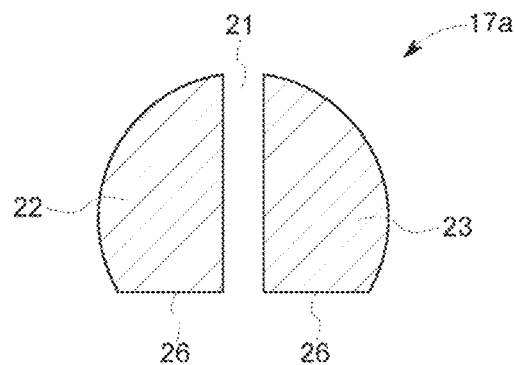

FIG. 7 shows a section of a third embodiment of the end 17a of the bar 17.

This embodiment differs from the embodiment shown in FIG. 6 in that one side of the free end of each branch 22 and 23 comprises a flat section 26.

Furthermore, the bar 17 is oriented such that the flat section 26 is facing the rotational axis of the rotor 12.

In the embodiments of the end 17a slit over the entire section, the centre of gravity of each branch 22, 23 is disposed such that the branches 22 and 23 move apart in an outwards direction relative to the bar 17 under the effect of centrifugal force when the rotor 12 is rotated.

The peripheral surface of the end 17a slit over the entire section of the bar 17 deformed under the effect of centrifugal force comes into contact, over the entire peripheral surface of the branches 22 and 23, with the through-hole 16a, which increases the contact surface area.

Figure 8:
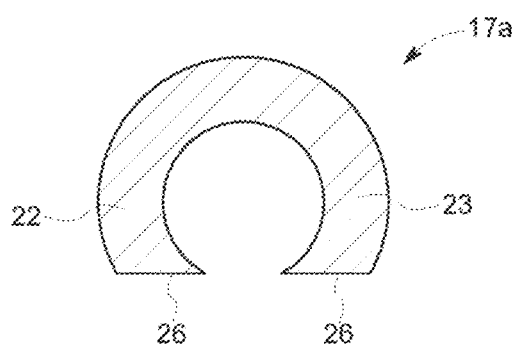
Figure 9:
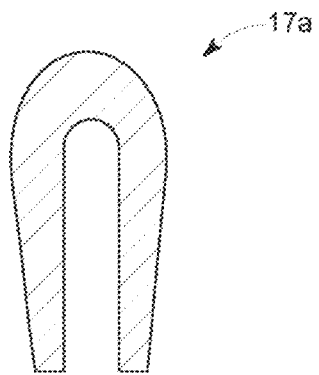
Figure 10:
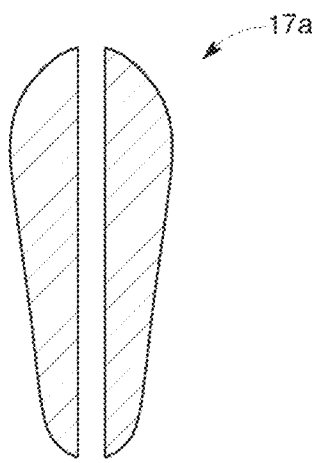
Figure 11:
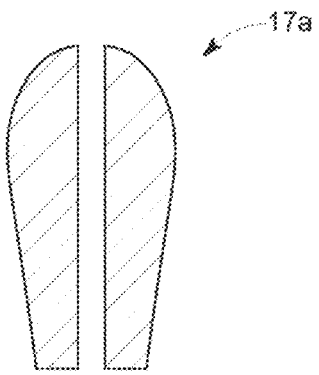
Figure 12:
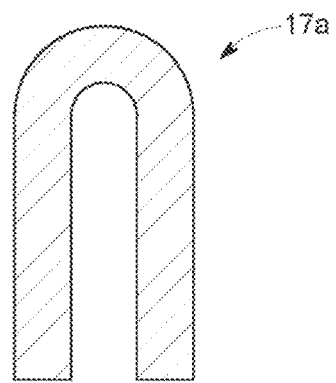
Figure 13:
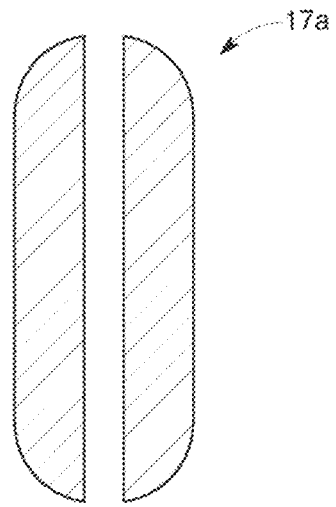

FIG. 8 shows a section of a fourth embodiment of the end 17a of the bar 17.

This embodiment differs from the embodiment shown in FIG. 5 in that the end is hollow and comprises a flat section 26.

In the embodiments of the end 17a of the bar 17, the section is round.

It goes without saying that the embodiments of the end 17a of the bar 17 are not limiting, whereby the sections can take various shapes including straight or curved ends connected by straight or curved sides, the sections can be partially or entirely slit and can comprise a flat section disposed on one side of the free end of each branch as shown in FIGS. 9 to 20.

The shapes are, for example, trapezoidal, rectangular or oblong.

When the end 17a of the bar 17 is slit over the entire section, the end 17a comprises two sub-parts separated by a plane perpendicular to the slit, the sub-part comprising the dimension perpendicular to the slit that is the longest faces the outer periphery of the rotor 12.

The width of the slit 21 is, for example, equal to about 5 to 30% of the dimension perpendicular to the slit that is the longest, preferably about 10 to 20% of the dimension perpendicular to the slit that is the longest.

If the bar 17 is partially slit, the radial depth of the slit 21 is, for example, equal to about 60 to 90% of the radial dimension of the bar 17, preferably equal to about 70 to 85% of the radial dimension of the bar 17.

The radial dimension of the bar 17 comprising a flat section is, for example, equal to about 40-90% of the radial dimension of the bar 17 that does not comprise a flat section, preferably about 70-80% of the radial dimension of the bar 17 that does not comprise a flat section.

Figure 22:
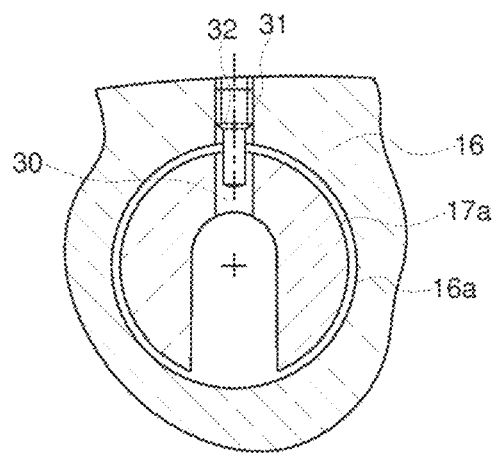

FIGS. 21, 22 and 23 show partial sectional views of a second embodiment of the rotor 12 in the axial direction and in the directions XXII-XXII and XXIII-XXIII.

The rotor shaft 13 of the rotor 12 is not penetrating and comprises two half-shafts 27 compacting the magnetic mass 15 comprising the metal plates 19, the half-shafts being connected by tie rods, not shown.

The compaction element comprises a compaction flange 28 of the half-shaft 27.

The short-circuit discs 16 are inserted between the magnetic mass 15 and the compaction flanges 28 such that the short-circuit discs 16 and the bars 17 form a squirrel cage.

The compaction flange comprises an insertion through-hole 29.

According to an alternative embodiment, not shown, the outer diameter of the compaction flange 28 is smaller than the pitch circle diameter of the bars 17 such that the bars can be inserted into the holes 16a.

The bar 17 is housed inside the recess 18 and comprises the end 17a as shown in FIG. 5.

The end 17a of the bar 17 comprises an oblong hole 30 oriented in an axial direction and the short-circuit disc 16 comprises a tapped through-hole 31.

A threaded pin 32 is inserted into the tapped through-hole 31 such that the pin 32 fits into the oblong hole 30 to prevent the conductor bar 17 from rotating about itself.

The oblong hole 30 compensates for the expansion of the conductor bar 17 under the effect of the heat generated by the current flow during operation, while limiting the displacement of the bar 17 in an axial direction to maintain electrical contact between the bar 17 and the short-circuit disc 16.

FIGS. 24, 25 and 26 show partial sectional views of a third embodiment of the rotor 12 in the axial direction and in the directions XXV-XXV and XXVI-XXVI.

This embodiment differs from the embodiment shown in FIGS. 21 to 23 in that the end 17a of the bar 17 comprises an oblong hole 33 oriented and opening out in an axial direction, with the pin 32 being inserted into the oblong hole 33 to prevent the bar 17 from rotating about itself.

FIGS. 27, 28 and 29 show partial sectional views of a fourth embodiment of the rotor 12 in the axial direction and in the directions XXVIII-XXVIII and XXIX-XXIX.

This embodiment differs from the embodiment shown in FIGS. 24 to 26 in that the conductor bar 17 extends partially into the insertion through-hole 29 in the compaction flange 28, the compaction flange comprising a tapped through-hole 34 into which the pin 32 is inserted.

The diameter of the through-holes 29 is larger than the diameter of the through-holes 16a in order to prevent interfering electrical contact between the bar 17 and the compaction flange 28.

The production of the tapped through-hole 34 is simplified compared to the production of the tapped through-hole 31 in the short-circuit disc 16, since steel is more resistant than copper.

Moreover, the section of the end 17a of the bar 17 is identical to the section shown in FIG. 6.

Since the end 17a of the bar 17 is slit over the entire section and over a length L2 opening out into the magnetic mass 15 and into the hole 29, the threaded pin 32 is inserted into the tapped through-hole 34 such that the pin 32 fits into the slit 21 in the end 17a of the bar 17 to prevent the conductor bar 17 from rotating about itself.

According to an alternative embodiment, not shown, a tapped through-hole is made in the conductor element 16, preferably close to the magnetic mass 15. A pin 32 is inserted into the tapped through-hole such that the pin 32 fits into the slit 21 in the end 17a of the bar 17 slit along the entire section to prevent the bar 17 from rotating about itself. The displacement of the bar 17 in an axial direction is limited in order to maintain electrical contact between the bar and the conductor element 16.

When the section of the end 17a of the bar 17 is not symmetrical relative to a median plane perpendicular to the slit as shown in FIGS. 9 to 10, 12, 14, 15, 17, 18 and 20, the end 17a comprises two sub-parts separated by a plane perpendicular to the slit, the sub-part comprising the dimension perpendicular to the slit that is the longest facing the outer periphery of the rotor 12.

The insertion of the pin 32 into the slit 21 to prevent the bar 17 from rotating about itself can also be applied to one end 17a of the bar 17 that is round with a flat section 26 as shown in FIG. 7.

The limitation of the axial displacement of the bar 17 can also be achieved by inserting a pin 32 at the end of the slit 21 close to the magnetic mass 15 in the bars in FIGS. 10, 11, 13, 14, 16, 17, 19 and 20 or by inserting a pin 32 into an oblong hole 30 oriented in an axial direction made in the end 17a of the bar 17 that is hollowed out in FIG. 8 or partially slit in FIGS. 9, 12, 15 and 18.

FIGS. 30 and 31 show partial sectional views of a fifth embodiment of the rotor 12 in the axial direction and in the direction XXXI-XXXI.

This embodiment differs from the embodiment shown in FIGS. 27 to 29 in that the conductor bar 17 does not extend into the insertion through-hole 29 in the compaction flange 28, the compaction flange 28 not comprising any tapped through-hole 34 or pin 32, the end 17a comprising the flat section 26 and comprising the slit 21 over the entire section that is identical to the section shown in FIG. 7.

The bar 17 is oriented such that the flat section 26 is facing the rotational axis of the rotor. The flat section 26 forms a recess 35 into which a flexible strip 36 is inserted so as to exert a radial pre-stress to bring the outer periphery of the end 17a of the bar 17 into contact with the short-circuit disc 16.

The flexible strip 36 is formed, for example, by a spring.

The flexible strip 36 comprises a flexible metal strip or a flexible insulating strip made of an electrically insulating material.

The flexible strip 36 can take any shape, for example the shape of a triangle. The free dimension of the flexible strip is greater than that of the recess 35 such that when inserted into the recess 35, it becomes deformed by compression in order to exert a radial prestressing load on the bar 17 towards the outer periphery of the rotor 12.

At low rotational speeds, in particular during the start-up phase of the rotating electrical machine, when the centrifugal force is not sufficient to deform the end 17a of the bar 17, the flexible strip 36 improves the electrical contact between the bar 17 and the through-hole 16a in the short-circuit disc 16 by pushing the end 17a of the bar 17 in a radial direction against the through-hole 16a in the short-circuit disc 16, preventing sparks caused by a poor contact.

FIGS. 32 and 33 show partial sectional views of a sixth embodiment of the rotor 12 in the axial direction and in the direction XXXIII-XXXIII.

Figure 14:
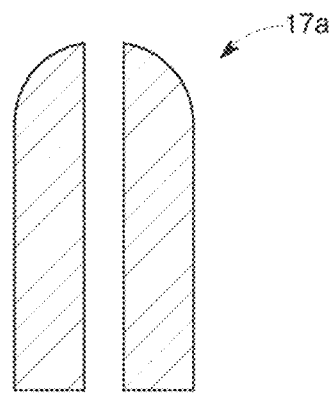
Figure 15:
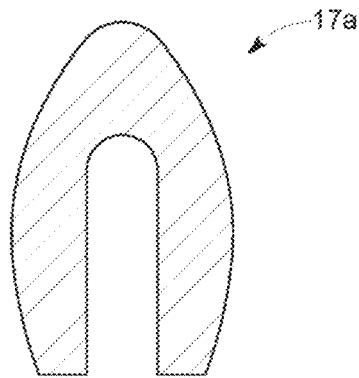
Figure 16:
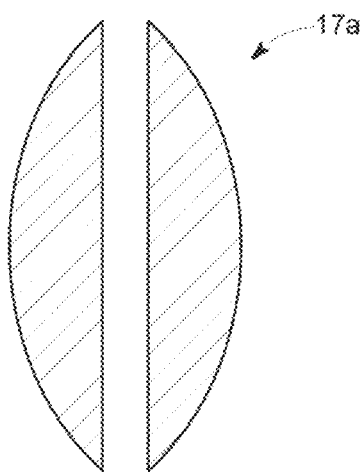
Figure 17:
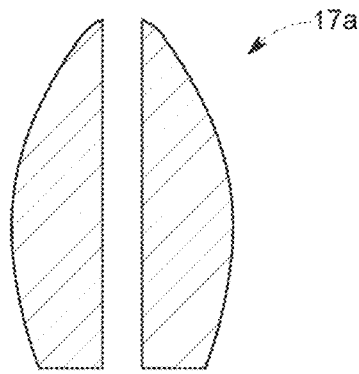
Figure 18:
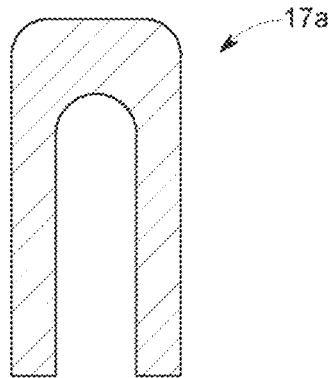
Figure 19:
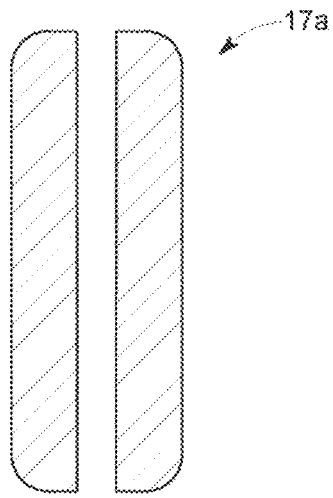
Figure 20:
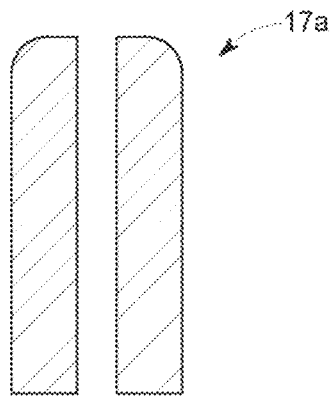

This embodiment differs from the embodiment shown in FIGS. 30 to 31 in that the section of the conductor bar 17 is rectangular with a rounded edge as shown in FIG. 14, the end 17a of the conductor bar 17 is slit and comprises the flat section 26.

The flat section 26 forms a recess 38 into which the flexible strip 36 is inserted so as to exert a radial pre-stress to bring the outer periphery of the end 17a of the bar 17 into contact with the through-hole 16a in the short-circuit disc 16.

The flexible strip 36 takes the shape of a corrugated sheet.

In the embodiments of the rotor 12 described hereinabove, the conductor bars 17 are evenly distributed over a diameter of the magnetic mass 15.

According to another embodiment, the conductor bars 17 can be distributed evenly over a plurality of diameters of the magnetic mass 15, at least one end of each conductor bar 17 being at least partially slit, at least one end of each conductor bar 17 comprising a flat section 26 and/or comprising the flexible element 36 so as to exert a radial pre-stress to bring the outer periphery of the end 17a of the bar 17 into contact with the conductor element 16.

FIG. 34 shows a partial sectional view of a seventh embodiment of the rotor 12 in a radial direction of the end 17a of the bar 17.

This embodiment differs from that shown in FIGS. 30 and 31 in that the recess 35 of the through-hole 16a comprises a second flat section 37.

The flexible strip 36 is inserted into the recess 35 bearing against the first flat section 26 of the end 17a of the bar 17 and bearing against the second flat section 37 of the through-hole 16a.

The flexible strip 36 exerts a radial pre-stress on the end 17a so as to bring the outer periphery of the end into contact with the through-hole 16a in the conductor element 16.

The faces of the flat section 37 prevent the flexible strip 36 from rotating, which is blocked and bears laterally against the faces of the flat section 37 in the through-hole 16a, the flexible strip 36 preventing the bar 17 from rotating about itself.

FIGS. 35 and 36 show partial sectional views of an eighth embodiment of the rotor 12 in the axial direction and in the direction XXXVI-XXXVI.

This embodiment differs from that shown in FIGS. 30 and 31 in that the compaction flange 28 includes a smaller outer diameter than the pitch circle diameter of the bars 17. The conductor bars do not extend to the end of the through-hole 16a in the conductor element 16 and a flexible strip 39 is inserted into the recess 35.

The flexible strip 39 is formed, for example, by a spring. The flexible strip 39 comprises a flexible metal strip or a flexible insulating strip made of an electrically insulating material.

The flexible strip 39 differs from the flexible strip 36 in that it extends beyond the end 17a of the bar 17.

The end opposite the magnetic mass 15 of the through-hole 16a comprises a groove 43 and a tapped hole 40 into which a plug 41 is screwed.

The plug 41 is preferably made of copper to prevent differential thermal expansions with the conductor element 16 and excessive heating of a steel plug due to iron losses of electromagnetic origin.

The flexible strip 39 comprises three segments formed, for example, by bending, the first and second segments inserted into the recess 35 become deformed under compression exerting a radial pre-stress on the flat section 26 of the end 17a to bring the outer periphery of the end 17a into contact with the through-hole 16a in the conductor element 16.

The end of the first segment bears against a bearing face 42 of the end 17a located at the end of the flat section 26 opposite the plug 41, radially oriented at the end 17a and substantially perpendicular to the flat section 26.

The third segment of the flexible strip 39 is housed in a space between the end 17a of the bar 17 and the plug 41. The end of the third segment is housed in the groove 43 opposite the flat section 26.

The plug 41 is screwed into the tapped hole 40 and pinches the end of the third segment housed in the groove 43 preventing the flexible strip 39 from rotating about itself, the flexible strip 39 bearing against the flat section 26 preventing the bar 17 from rotating about itself.

Since the end of the first segment bears against the bearing face 42 of the end 17a and since the end of the third segment is pinched inside the groove 43 by the plug 41, the flexible strip 39 limits the displacement of the bar 17 in an axial direction to maintain electrical contact between the bar 17 and the conductor element 16.

The third segment housed between the end 17a and the plug 41 is inclined, for example substantially perpendicular to the second segment of the flexible strip 39, such that the third segment becomes deformed in the axial direction by the screwing of the plug 41 into the tapping 40, which exerts an axial pre-stress on the flexible strip 39.

The bearing of the end of the first segment against the bearing face 42 of the end 17a exerts an axial pre-stress on the bar 17, limiting interfering vibrations of the bar 17 in the axial direction when the rotor 12 is rotating, without preventing the free thermal expansion of the bar 17 in the axial direction since the third inclined segment is flexible.

The flexible strip 39 performs a first function of radially pre-stressing the bar 17 to improve the electrical contact at a low rotational speed of the rotor 12, a second function of axially pre-stressing the bar 17 to limit the displacement and the interfering vibrations in the axial direction of the bar 17, while allowing for the free axial thermal expansion of the bar 17 and a third function of preventing the bar 17 from rotating about itself.

The end 17a that is slit over the entire section of the bar 17 combined with the radial pre-stress exerted by the flexible strip 39 increase the contact surface area between the end 17a and the through-hole 16a in the conductor element 16, thus reducing the axial length of the end 17a ensuring the flow of electric current by contact with the conductor element 16 for the same axial thickness of the conductor element 16. The reduction in the axial length of the end 17a creates an empty space in the through-hole 16a for housing the third segment of the flexible strip 39, the groove 43 and the plug 41 screwed into the tapping 40.

According to an alternative embodiment, not shown, the flexible strip has a corrugated shape inserted under the flat section 26 in the recess 35, with an inclined segment of the flexible strip being housed inside the insertion through-hole 29 in the compaction flange 28, and the end of the inclined segment being housed inside a groove and pinched by a plug screwed into a tapping of the insertion through-hole 29 at the end opposite the magnetic mass 15.

According to yet another alternative embodiment, an electrically insulating element is placed between the screwed plug and the end of the inclined segment of the flexible strip housed inside a groove of a tubular electrically insulating element housed inside the insertion through-hole 29 and bearing against the conductor element 16.

The section of the end of the conductor bars and/or the insertion of flexible elements to exert a pre-stress on the conductor bars allow the contact surface area between the bars and the conductor elements to be improved in order to increase the torque and power developed by the squirrel-cage rotating electrical machine without changing the physical features of the machine, in particular the number of bars inserted into the rotor.

The invention claimed is:

1. A conductor bar for a squirrel-cage rotor, comprising:
at least one end which is partially slit such that a section of the end forms two symmetrical branches relative to the slit, the centre of gravity of each branch is disposed away from the slit such that the branches move apart in an outwards direction relative to the bar under the effect of centrifugal force when the rotor is rotated, wherein the bar is configured such that the peripheral surface of the bar deformed under the effect of centrifugal force comes into contact with the surface of a through-hole in a short-circuit disc of the rotor, thereby creating a contact surface therebetween that extends about an angle greater than 180°.

2. The conductor bar according to claim 1, wherein the end having a round section is hollow and comprises a flat section disposed at the free ends of the branches.

3. The conductor bar according to claim 1, wherein the section includes straight or curved ends connected by straight or curved sides.

4. The conductor bar according to claim 3, wherein the section further comprises a flat section disposed at a free end of each branch.

5. The conductor bar according to claim 3, wherein the end is slit along the entire section.

6. A squirrel-cage rotor for a squirrel-cage asynchronous rotating electrical machine, comprising:
two compaction elements clamping a cylindrical magnetic mass, with conductor elements inserted between the magnetic mass and the compaction elements, and conductor bars according to claim 1 disposed in recesses in the magnetic mass and distributed evenly over at least one diameter of the magnetic mass such that the conductor elements and the conductor bars form a squirrel cage, the end of the bars being partially slit over at least one distance facing the conductor element, and each conductor bar being oriented in a recess such that the slit is directed towards a rotational axis of the rotor.

7. The squirrel-cage rotor according to claim 6, wherein, when the end of the bar is partially slit, the part of the end connecting the two branches faces the outer periphery of the rotor.

8. The squirrel-cage according to claim 7, wherein the end comprises an oblong hole oriented in an axial direction and the conductor element comprises a tapped through-hole, a threaded pin being inserted into the tapped through-hole such that the pin fits into the oblong hole to prevent the conductor bar from rotating about itself.

9. The squirrel-cage rotor according to claim 7, wherein the end comprises an oblong hole oriented and opening out in an axial direction, and the conductor element comprises a tapped through-hole, a threaded pin being inserted into the tapped through-hole such that the pin fits into the oblong hole to prevent the conductor bar from rotating about itself.

10. The squirrel-cage rotor according to claim 6, wherein, when the end of the bar is slit over the entire section, the end comprises two sub-parts separated by a plane perpendicular to the slit, the sub-part comprising the dimension perpendicular to the slit that is the longest facing the outer periphery of the rotor.

11. The squirrel-cage rotor according to claim 10, wherein the conductor element or the compaction element comprises a tapped through-hole, a threaded pin being inserted into the tapped through-hole such that the pin fits into the slit to prevent the conductor bar from rotating about itself.

12. The squirrel-cage rotor according to claim 6, wherein, when the end of the bar comprises a flat section, the bar is furthermore oriented such that the flat section is facing a rotational axis of the rotor.

13. The squirrel-cage rotor according to claim 12, wherein the end of the conductor bar comprising a flat section forms a recess, a flexible strip being inserted into said recess so as to exert a radial pre-stress to bring the outer periphery of the end of the bar into contact with the conductor element.

14. The squirrel-cage rotor according to claim 12, wherein the end of the conductor bar comprising:
 a flat section forms a recess,
 a flexible strip being inserted into said recess and comprising three segments,
 a first and a second segments being inserted into the recess so as to exert a radial pre-stress to bring the outer periphery of the end of the bar into contact with the conductor element, one end of the first segment bearing against a bearing face of the end located at the end of the flat section opposite a plug screwed into a tapping located opposite the magnetic mass of the conductor element or of the compaction element,
 the third segment of the flexible strip being housed in a space between the end of the bar and the plug, one end of the third segment being housed in a groove in the through-hole located opposite the magnetic mass and being pinched by the screwed plug, the flexible inclined segment being deformed in an axial direction by the plug screwing operation so as to exert an axial pre-stress on the bearing face of the conductor bar to limit the displacement of the conductor bar in the axial direction and so as to prevent the bar from rotating about itself.

15. The squirrel-cage rotor according to claim 14, wherein the flexible strip comprises a flexible metal strip or a flexible insulating strip.

16. The squirrel-cage rotor according to claim 14, wherein the compaction element comprises a clamping plate or a compaction flange of a non-through half-shaft.

17. The squirrel-cage rotor according to claim 14, wherein the magnetic mass comprises compacted magnetic sheets.

18. The squirrel-cage rotor according to claim 14, wherein the magnetic mass comprises a stack of metal plates.

19. The squirrel-cage rotor according to claim 14, wherein the magnetic mass comprises a one-piece body.

20. A squirrel-cage asynchronous rotating electrical machine comprising a rotor according to claim 6.

* * * * *